United States Patent
DeBie

(10) Patent No.: US 7,856,436 B2
(45) Date of Patent: Dec. 21, 2010

(54) DYNAMIC HOLDS OF RECORD DISPOSITIONS DURING RECORD MANAGEMENT

(75) Inventor: Tod DeBie, Costa Mesa, CA (US)

(73) Assignee: International Business Machines Corporation, Armonk, NY (US)

( * ) Notice: Subject to any disclaimer, the term of this patent is extended or adjusted under 35 U.S.C. 154(b) by 315 days.

(21) Appl. No.: 11/317,712

(22) Filed: Dec. 23, 2005

(65) Prior Publication Data

US 2007/0150445 A1 Jun. 28, 2007

(51) Int. Cl.
  *G06F 7/00* (2006.01)
  *G06F 17/30* (2006.01)
  *G06F 15/16* (2006.01)
  *G06Q 40/00* (2006.01)

(52) U.S. Cl. .......................... 707/736; 709/229; 705/4

(58) Field of Classification Search .................. None
See application file for complete search history.

(56) References Cited

U.S. PATENT DOCUMENTS

| | | | |
|---|---|---|---|
| 4,608,679 A | 8/1986 | Rudy et al. | |
| 4,675,856 A | 6/1987 | Rudy et al. | |
| 4,685,095 A | 8/1987 | Rudy et al. | |
| 5,144,556 A | 9/1992 | Wang et al. | |
| 5,710,921 A | 1/1998 | Hirose | |
| RE35,861 E | 7/1998 | Queen | |
| 5,813,009 A | 9/1998 | Johnson et al. | |
| 5,940,804 A | 8/1999 | Turley et al. | |
| 6,061,679 A | 5/2000 | Bournas et al. | |
| 6,141,754 A | 10/2000 | Choy | |
| 6,253,369 B1 | 6/2001 | Cloud et al. | |
| 6,314,437 B1 | 11/2001 | Starek et al. | |
| 6,338,074 B1 | 1/2002 | Poindexter et al. | |
| 6,347,299 B1 * | 2/2002 | Holzman et al. | ............. 704/270 |
| 6,360,234 B2 | 3/2002 | Jain et al. | |
| 6,505,219 B1 | 1/2003 | MacLean et al. | |
| 6,553,365 B1 | 4/2003 | Summerlin et al. | |
| 6,581,069 B1 * | 6/2003 | Robinson et al. | ......... 707/104.1 |
| 6,690,774 B1 | 2/2004 | Chang et al. | |
| 7,010,602 B2 | 3/2006 | Poindexter et al. | |

(Continued)

FOREIGN PATENT DOCUMENTS

WO 9905632 2/1999

OTHER PUBLICATIONS

Paul Dourish; Extending Document Management Systems with User-Specific Active Properties; 200;ACM; vol. 18, Issue 2; pp. 140-170.*

(Continued)

*Primary Examiner*—Neveen Abel Jalil
*Assistant Examiner*—Jermaine Mincey
(74) *Attorney, Agent, or Firm*—Janaki K. Davda; Konrad Raynes & Victor LLP

(57) ABSTRACT

Dynamically withholding certain records from a disposition during record management. Search criterion that identifies records that should be withheld from the disposition may be received. The content of the records and/or information about that record content may be compared to the search criterion to determine which of the records should be withheld from the disposition. The comparison may take place in accordance with a pre-determined schedule, when hold status information for a record is accessed, or at any other time.

31 Claims, 4 Drawing Sheets

U.S. PATENT DOCUMENTS

| | | | |
|---|---|---|---|
| 7,080,066 | B1 | 7/2006 | Scheurich et al. |
| 7,159,178 | B2 | 1/2007 | Vogt et al. |
| 7,213,022 | B2 | 5/2007 | Whelan et al. |
| 7,237,184 | B2 | 6/2007 | Ballard et al. |
| 7,321,886 | B2 | 1/2008 | Swaminathan et al. |
| 7,401,057 | B2 | 7/2008 | Eder |
| 7,428,724 | B2 | 9/2008 | Pike et al. |
| 2001/0013004 | A1 | 8/2001 | Haris et al. |
| 2001/0039542 | A1* | 11/2001 | Okada et al. ............... 707/3 |
| 2002/0032689 | A1 | 3/2002 | Abbott, III et al. |
| 2002/0055888 | A1 | 5/2002 | Beran et al. |
| 2002/0059466 | A1 | 5/2002 | Poindexter et al. |
| 2002/0137493 | A1 | 9/2002 | Dutta |
| 2003/0023736 | A1* | 1/2003 | Abkemeier ............. 709/229 |
| 2003/0046369 | A1 | 3/2003 | Sim et al. |
| 2003/0093458 | A1 | 5/2003 | Poindexter et al. |
| 2003/0105738 | A1 | 6/2003 | Taketa et al. |
| 2003/0135559 | A1 | 7/2003 | Bellotti et al. |
| 2003/0182332 | A1 | 9/2003 | McBrearty et al. |
| 2003/0182380 | A1 | 9/2003 | Yabe et al. |
| 2003/0187878 | A1* | 10/2003 | Sandifer ............... 707/104.1 |
| 2003/0236788 | A1 | 12/2003 | Kanellos et al. |
| 2004/0039646 | A1 | 2/2004 | Hacker et al. |
| 2004/0054685 | A1* | 3/2004 | Rahn et al. ............... 707/102 |
| 2004/0117358 | A1 | 6/2004 | von Kaenel et al. |
| 2004/0128182 | A1 | 7/2004 | Pepoon et al. |
| 2004/0168058 | A1 | 8/2004 | Margolus |
| 2004/0187140 | A1 | 9/2004 | Aigner et al. |
| 2004/0193740 | A1 | 9/2004 | Kasmirsky et al. |
| 2004/0230941 | A1 | 11/2004 | Marin et al. |
| 2004/0249871 | A1 | 12/2004 | Bazoon |
| 2004/0260769 | A1* | 12/2004 | Yamamoto ............. 709/203 |
| 2005/0027696 | A1 | 2/2005 | Swaminathan et al. |
| 2005/0044197 | A1 | 2/2005 | Lai |
| 2005/0055519 | A1 | 3/2005 | Stuart et al. |
| 2005/0076049 | A1* | 4/2005 | Qubti et al. ............... 707/102 |
| 2005/0080771 | A1* | 4/2005 | Fish ............................ 707/3 |
| 2005/0149365 | A1* | 7/2005 | Johnson ..................... 705/4 |
| 2005/0154723 | A1* | 7/2005 | Liang ......................... 707/3 |
| 2005/0216448 | A1* | 9/2005 | Talib et al. .................. 707/3 |
| 2005/0222984 | A1* | 10/2005 | Radestock et al. .......... 707/3 |
| 2005/0222993 | A1* | 10/2005 | Ohtomo ..................... 707/3 |
| 2005/0246276 | A1* | 11/2005 | Lee et al. .................. 705/40 |
| 2006/0004689 | A1 | 1/2006 | Chandrasekaran et al. |
| 2006/0005157 | A1 | 1/2006 | Saxena et al. |
| 2006/0047650 | A1 | 3/2006 | Freeman et al. |
| 2006/0085245 | A1 | 4/2006 | Takatsuka et al. |
| 2006/0085374 | A1 | 4/2006 | Mayes et al. |
| 2006/0149735 | A1 | 7/2006 | DeBie et al. |
| 2006/0179061 | A1 | 8/2006 | D'Souza et al. |
| 2006/0230044 | A1 | 10/2006 | Utiger |
| 2006/0282292 | A1 | 12/2006 | Brink et al. |
| 2007/0088585 | A1 | 4/2007 | Maguire |
| 2007/0088715 | A1 | 4/2007 | Slackman et al. |
| 2007/0088736 | A1 | 4/2007 | DeBie |
| 2007/0168315 | A1 | 7/2007 | Covannon et al. |
| 2007/0192423 | A1 | 8/2007 | Karlson |
| 2007/0239715 | A1 | 10/2007 | DeBie |
| 2007/0260619 | A1 | 11/2007 | Whelan et al. |
| 2007/0271308 | A1 | 11/2007 | Bentley et al. |
| 2007/0271517 | A1 | 11/2007 | Finkelman et al. |

OTHER PUBLICATIONS

FileNet Corp., "FileNet Content Manager Architecture", An Architecture White Paper, Feb. 2003, 47 pp.

AIIM—The ECM Association, "FilNet Minimizes Burden of Records Management Decisions with FileNet Records Manager", [online], 2005. [Retrieved on Jan. 2, 2008]. Retrieved from the Internet at <URL: http:www.aiim.org/article-docrep.asp?ID=28516>, 5 pp.

FileNet, "FileNet Records Manager Business White Paper", [online], May 2004. Retrieved from the Internet at <URL: http://www.documentaccess.net/download/rm_whitepaper.pdf>, 13 pp.

International Preliminary Report, Mar. 5, 2009, for International Application No. PCT/US2005/013588, 10 pp.

Notification Concerning Availability of the Publication of the International Application, Apr. 2, 2009, for International Application No. PCT/US2005/013588, 1 p.

Wikipedia, "Hierarchical Storage Management", [online], [retrieved on Feb. 7, 2008]. Retrieved from the Internet at <URL: http://en.wikipedia.org/wiki/Hierarchial_storage_management>, 3 pp.

Wikipedia, "Information Lifecycle Management", [online], [retrieved on Feb. 7, 2008]. Retrieved from the Internet at <URL: http://en.wikipedia.org/wiki/Information_Lifecycle_Management>, 5 pp.

Shegda, K. "FileNet P8 Enterprise Content Management Solutions", Jun. 11, 2003 Product Report, Gartner, 13 pp.

Compulink Management Center, Inc., "Laserfiche 7: Records Management Edition", revised Oct. 31, 2005, 7 pp.

Compulink Management Center, Inc., "LaserFiche Records Management Edition Training Guide", Aug. 31, 2004, 65 pp.

Compulink Management Center, Inc., "LaserFiche Workflow Suite Reviewer's Guide", Version 5, Jun. 22, 2001, 26 pp.

Compulink Management Center, Inc., "Requirements of a Records Management Application", [online], 2004, [retrieved on Jun. 13, 2007], retrieved from the Internet at <URL: http://web.archive.org/web/055608/http://www.laserfiche.com/resources/recordsmanagerguide/requirements.html>, 6 pp.

Eddin, A.S., "How to Write to Centera Storage Appliances", [online] Oct. 25, 2007, [retrieved on Aug. 15, 2008], retrieved from the Internet at <URL: http://www.codeproject.com/KB/winsdk/CenteraStorageAppliances.aspx?display=Print>, 26 pp.

Elmasri, R. and S.B. Navathe, "Fundamentals of Database Systems", Sep. 30, 1999, 3rd Ed., Addison-Wesley, Reading, MA, 8 pp.

EMC Corp., "EMC Centera Family", [online] © 2008, [retrieved on Aug. 19, 2008], retrieved from the Internet at <URL: http://www.emc.com/products/family/emc-centera-family.htm>, 2 pp.

FileNet Corp., "Business Process Manager", © 2003, 6 pp.

FileNet Corp., "Content Manager", © 2003, 6 pp.

FileNet Corp., "FileNet Business Process Manager", Technical White Paper, Aug. 2003, 48 pp.

FileNet Corp., "FileNet P8 Workplace", © 2003, 4 pp.

International Search Report and Written Opinion, May 21, 2008, for PCT/US05/13588, 14 pp.

NetApp, "NearStore on FAS", [online] © 2008, [retrieved on Aug. 19, 2008], retrieved from the Internet at <URL: http://www.netapp.com/us/products/storage-systems/nearstore-fas/>, 1 pp.

NetApp, "SnapLock Compliance and SnapLock Enterprise Software", [online] © 2008, [retrieved on Aug. 15, 2008], retrieved from the Internet at <URL: http://www.netapp.com/us/products/protection-software/snaplock.html>, 3 pp.

* cited by examiner

DYNAMIC HOLDS OF RECORD DISPOSITIONS DURING RECORD MANAGEMENT

BACKGROUND

1. Field

This application relates to record management systems and methods, including record management systems and methods that manage the disposition of records and withhold records from these dispositions.

2. Related Art

A broad variety of records often need to be managed, such as records relating to transactions, designs, safety, maintenance, and communications, including e-mails. These records are often managed by computers in what are commonly known as record management systems.

Record management systems often provide a variety of functions. One common function is to manage the disposition of records, such as the destruction, transfer, review and/or archiving of records. The record management system may be used to identify records that are ripe for a particular disposition and/or to track their disposition status.

Dispositions are often performed in accordance with established policies. One policy, for example, might be to destroy all records that are older than six years.

Records sometimes need to be withheld from one or more dispositions that would otherwise result by the application of disposition policies. For example, certain records might need to be exempted from a policy that calls for the destruction of all records that are older than six years to preserve them as evidence for litigation, such as litigation relating to insurance or product liability claims. Another example is withholding certain records from a disposition because of an internal or IRS audit.

The approaches used by current record management systems for withholding records from dispositions are sometimes less than completely satisfactory. One approach, for example, has been to place an entire branch of records in a hierarchical system on hold. Unfortunately, the records that must be withheld from the disposition sometimes do not correspond precisely with a branch in the hierarchy. To ensure complete coverage, a very high branch in the hierarchy must sometimes be selected. This may result in some records being erroneously withheld from the disposition.

Another approach has been to search for the needed records. This approach, however, can sometimes be time-consuming, particularly when a large number of records must be withheld.

New records are often added to the record management system after the disposition of certain, existing records has already been placed on hold. Sometimes, some of these new records should also be withheld from the disposition. However, this may not occur because they are added after the hold had been applied.

Locating and marking records to be withheld from a disposition can also sometimes consume a great deal of processing power, sometimes causing delays in other processing functions, such as the transfer of information into or out of the system through the user interface.

SUMMARY

A dynamic method for withholding certain records in a records management system from a disposition may include receiving search criterion that identifies records that should be withheld from the disposition; storing the search criterion; receiving record data comprising the content of records and/or information describing the records; storing the record data; and comparing the record data with the search criterion in accordance with a pre-determined schedule to determine which of the records should be withheld from the disposition. The pre-determined schedule may repeat periodically. The method may include marking the record data to identify the records that should be withheld from the disposition based on the comparing.

A dynamic method for withholding certain records in a records management system from a disposition may include receiving search criterion that identifies records that should be withheld from the disposition; storing the search criterion; receiving record data comprising the content of records and/or information describing the records; storing the record data along with hold status information for each record indicating whether the record should be withheld from the disposition; accessing the hold status information for one of the records; and comparing the record data about the one of the records with the search criterion to determine whether the record data for the one of the records matches the search criterion. The method may include modifying the hold status information for the one of the records after the comparing to reflect that the one of the records should be withheld from the disposition. The accessing, comparing and modifying may be performed sequentially within the same operating session. The accessing may occur as part of an effort to determine which records in the records management system are ripe for the disposition. The record data may include information describing the records and the accessing may occur as part of an effort to examine a portion of this information.

A dynamic method for withholding certain records in a records management system from a disposition may include receiving search criterion that identifies records that should be withheld from the disposition; storing the search criterion; receiving record data comprising the content of records and/or information describing the records; storing the record data; identifying one or more records within the record data that are ripe for the disposition; and comparing the record data about the one or more records with the search criterion to determine whether the record data for the one or more of the records matches the search criterion. The dynamic method may include withholding from the disposition all records in the one or more records that match the search criterion. The dynamic method may include not withholding from the disposition all records in the one or more records that do not match the search criterion.

A dynamic method for withholding records in a records management system from a disposition may include receiving search criterion that identifies records that should be withheld from the disposition; storing the search criterion; receiving record data comprising the content of records and/or information describing the records after receiving and storing the search criterion; storing the record data; and comparing at least a portion of the record data with the search criterion to determine which of the records should be withheld from the disposition. The method may include marking the record data to identify the records that should be withheld from the disposition.

The method may include receiving second search criterion that identifies a second set of records that should be withheld from a second disposition; storing the second search criterion; and comparing the record data about the one of the records with the first search criterion and the second search criterion to determine whether the record data for the one of the records matches either search criterion. The first search criterion may be received on a different day than the second search criterion. The first search criterion and the second search criterion may be different. The first disposition and the second disposition may be different. At least a portion of the record data that is compared may be received and stored after the receiving and storing of the search criterion.

A dynamic method for designating certain records in a records management system that should be withheld from one or more dispositions may include receiving search criterion that identifies records in the records management system that should be withheld from a disposition; receiving an identification of the disposition; and storing the search criterion, the identification of the disposition, and a relationship between the two.

The method may include receiving a second search criterion that identifies a second set of records in the records management system that should be withheld from a second disposition, the second search criterion being different from the first search criterion; receiving an identification of the second disposition; and storing the second search criterion, the identification of the second disposition, and a relationship between the two, together with the first search criterion, the identification of the first disposition and the relationship between the two. The storing of the relationships may include storing the first criterion and the identification of the first disposition in a first record and storing the second criterion and the identification of the second disposition in a second record.

A system for withholding certain records in a records management system from a disposition may include first storage media configured to store search criterion; second storage media configured to store a pre-determined schedule; third storage media configured to store record data comprising the content of records and/or information describing the records; and a processing system. The processing system may be configured to receive search criterion that identifies records that should be withheld from the disposition; store the search criterion in the first storage media; receive record data comprising the content of records and/or information describing the records; store the record data in the third storage media; and compare the record data with the search criterion in accordance with the pre-determined schedule to determine which of the records should be withheld from the disposition.

A system for withholding certain records in a records management system from a disposition may include first storage media configured to store search criterion; second storage media configured to store record data comprising the content of records and/or information describing the records and hold status information for each record indicating whether the record should be withheld from the disposition; and a processing system. The processing system may be configured to receive search criterion that identifies records that should be withheld from the disposition; store the search criterion in the first storage media; receive record data comprising the content of records and/or information describing the records; store the record data along with hold status information for each record indicating whether the record should be withheld from the disposition in the second storage media; access the hold status information for one of the records; and compare the record data about the one of the records with the search criterion to determine whether the record data for the one of the records matches the search criterion.

A system for withholding certain records in a records management system from a disposition may include first storage media configured to store search criterion; second storage media configured to store record data comprising the content of records and/or information describing the records; and a processing system. The processing system may be configured to receive search criterion that identifies records that should be withheld from the disposition; store the search criterion in the first storage media; receive record data comprising the content of records and/or information describing the records; store the record data in the second storage media; identify one or more records within the record data that are ripe for the disposition; and compare the record data about the one or more records with the search criterion to determine whether the record data for the one or more records matches the search criterion.

Computer-readable media containing computer programming instructions may implement a method when run on a computing system. The method may include receiving search criterion that identifies records that should be withheld from a disposition; storing the search criterion; receiving record data comprising the content of records and/or information describing the records; storing the record data; and comparing the record data with the search criterion in accordance with a pre-determined schedule to determine which of the records should be withheld from the disposition.

Computer-readable media containing computer programming instructions may implement a method when run on a computing system. The method may include receiving search criterion that identifies records that should be withheld from a disposition; storing the search criterion; receiving record data comprising the content of records and/or information describing the records; storing the record data along with hold status information for each record indicating whether the record should be withheld from the disposition; accessing the hold status information for one of the records; and comparing the record data about the one of the records with the search criterion to determine whether the record data for the one of the records matches the search criterion.

Computer-readable media containing computer programming instructions that may implement the following method when run on a computing system: receiving search criterion that identifies records that should be withheld from a disposition; storing the search criterion; receiving record data comprising the content of records and/or information describing the records; storing the record data; identifying one or more records within the record data that are ripe for the disposition; and comparing the record data about the one or more records with the search criterion to determine whether the record data for the one or more records matches the search criterion.

These as well as further features, objects and benefits will now become clear upon a review of the following Detailed Description of Illustrative Embodiments and the attached drawings.

DETAILED DESCRIPTION OF ILLUSTRATIVE EMBODIMENTS

Figure 1:
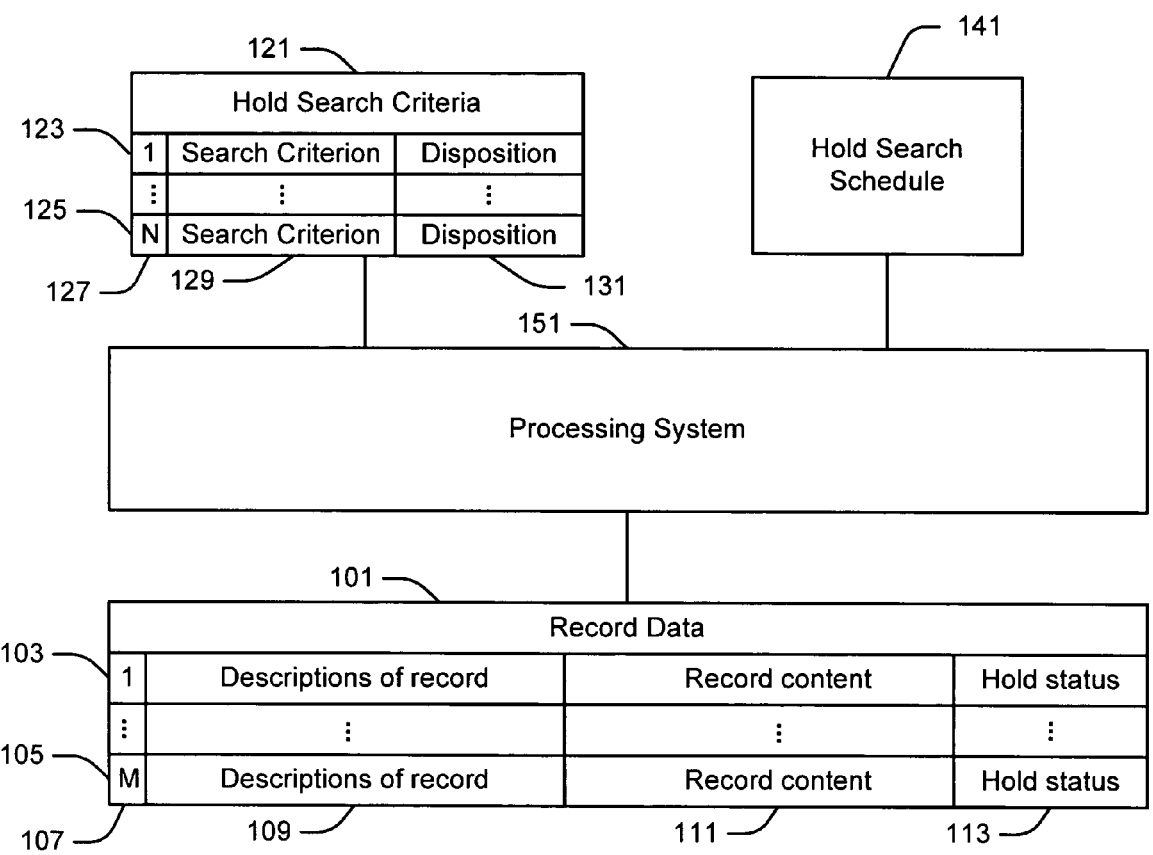
FIG. 1 is a block diagram of a record management system with hold search criteria.

FIG. 1 is a block diagram of a record management system with hold search criteria. As shown in FIG. 1, record data 101 may include a plurality of records, such as records 103 and 105. Each record may include a variety of fields, such as record id fields 107, descriptions of record fields 109, record content fields 111, and hold status fields 113.

The record id fields 107 may each contain any type of information that identifies the record, such as a unique identifier, such as a unique number. Record ids are not necessary.

The descriptions of record fields 109 may each be one or several separate fields that provide information about the record. They may include a textual description of the record (e.g., letter), the date of the record, the author of the record, recipients of the record, and/or a broad variety of other types of information. In general, the descriptions of record fields 109 may each describe the record and are commonly referred to as metadata.

Any type of record may be referenced and/or stored as part of the record data 101, including records relating to transactions, designs, safety, maintenance, and communications, including e-mails. The record content fields 111 may each include the entire content of the record and/or a pointer to another file or set of files that contain that content. The content may be in text format, image format, and/or in any other format. The record content fields may also point to physical records, such as records that may be physically stored in boxes, file cabinets and/or folders.

The hold status fields 113 may each contain information indicating whether the record should be withheld from a particular disposition. In some systems, each record might be potentially subject to several dispositions, such as destruction, transfer, review and/or archiving. In such a system, the hold status fields 113 may each indicate, not only whether a disposition of a particular record is on hold, but the identification of the particular disposition that is on hold. In some systems, the hold status of a record may be tracked in connection with several types of dispositions by using a separate hold status tracking table (not shown).

The records in the record data 101 may have a different number of fields than what has now been discussed, such as a smaller number of fields or a larger number of fields. For example, some systems may not include the record content fields 111. Other systems may not include the descriptions of record fields 109. Other systems may not include the hold status fields 113. Other systems may include additional fields.

The record management system shown in FIG. 1 may include hold search criteria 121. The hold search criteria 121 may include several records, such as records 123 and 125. Each record may include record id fields 127, search criterion fields 129 and disposition fields 131.

Record id fields 127 may each contain any type of information that identifies the record, such as a unique identifier, such as a unique number. Record ids are not necessary.

Search criterion fields 129 may each include user-entered search criterion for locating records that should be withheld from a particular disposition. The search criterion fields 129 may each be in any format that is suitable for the record management system. For example, each may target the information contained within one or more of the descriptions of record fields 109 and/or the textual or image information in the record content fields 111 or the files to which the record content fields 111 point. The search criterion fields 129 may be in any format. They may include Boolean operators and may invoke fuzzy and/or other types of searching logic.

The disposition fields 131 may each indicate the particular disposition from which each record matching its corresponding search criterion should be withheld. For example, record 123 might include a search criterion that targets all e-mails from John Smith that are older than six years, while its corresponding disposition field might indicate that all matching records are to be withheld from the destruction disposition.

A hold search schedule 141 may be included and may include information indicative of a pre-determined schedule that should be followed by the record management system for locating and marking records in the record data 101 that should be withheld from one or more dispositions. The schedule may be of any type. For example, the schedule may, specify a particular time on a particular day. The schedule may be keyed to a particular event. The schedule may call for a one-time search, several searches at different times, or an infinite series of searches. The hold search schedule 141 may be a periodic schedule, requiring hold searches to be performed periodically, such as every day, week or month.

A processing system 151 may be configured to deliver, receive and evaluate the record data 101, the hold search criteria 121, and the hold search schedule 141, as well as to interface with other components and information that may be in the system, such as input/output devices. The processing system 151 may be configured to cause data and other information to be managed within the record management system in accordance with the methods described herein.

Figure 2:
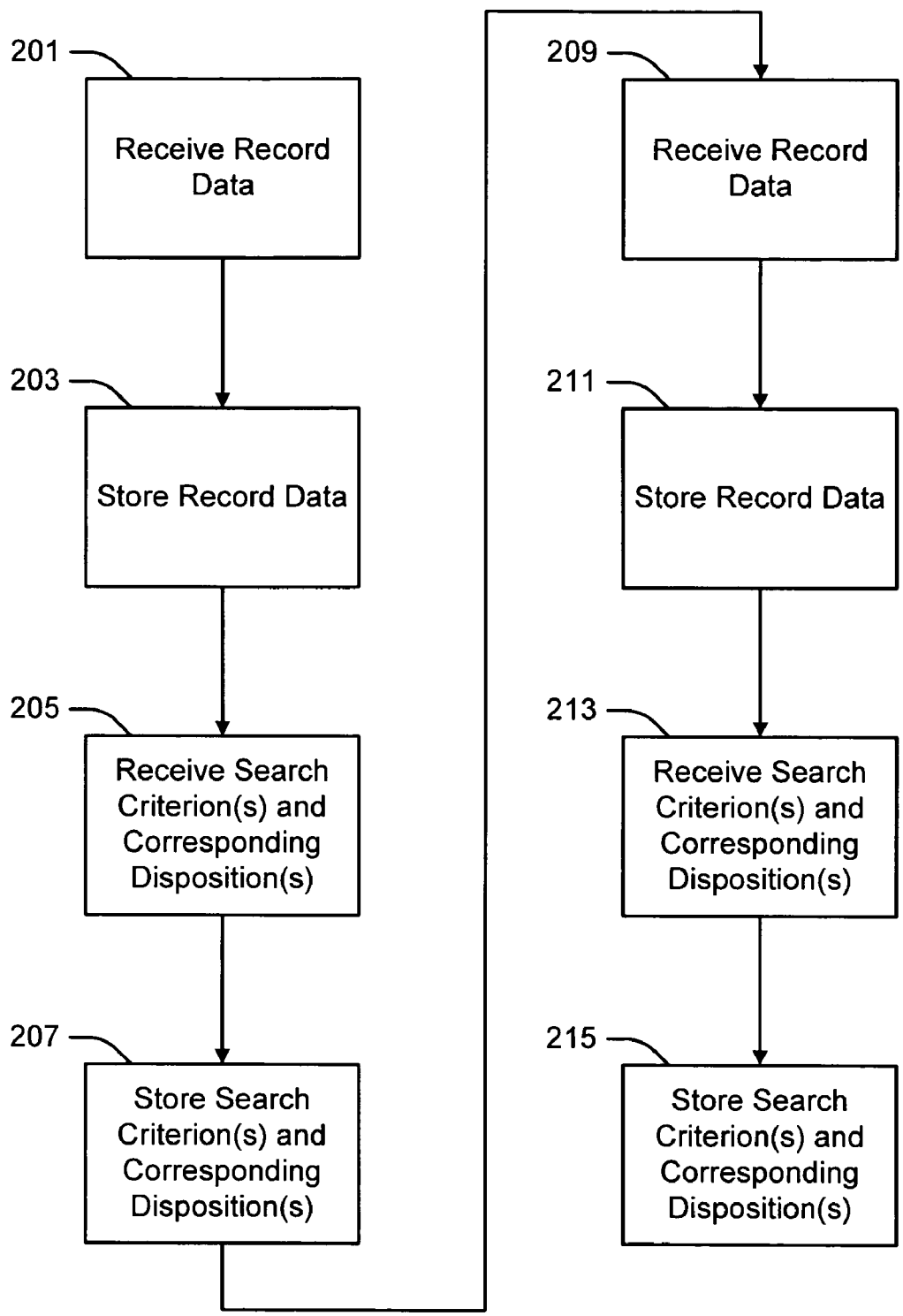
FIG. 2 is a flow diagram of a record management method that receives and stores record data and hold search criteria.

FIG. 2 is a flow diagram of a record management method that receives and stores record data and hold search criteria. A Receive Record Data step 201 signifies the receipt of record data. The record data may include one or more data records, such as the records 103 and 105 that are shown in FIG. 1. Each data record may contain one or more fields of information, such as the fields of information described in connection with the record data 101 in FIG. 1. For example, the data for each record may include descriptions of record fields 109 and a record content field 111. In some systems, the record data may not include the descriptions of record fields 109, while in other systems it may not include the record content fields 111. As explained in connection with FIG. 1, moreover, the record content fields 111 may merely point to the record content that is received (e.g., text or image information), rather than to contain that content.

The received record data may include the hold status fields 113 shown in FIG. 1. The hold status fields may be initialized to initially indicate that there is no hold on any disposition, or it may initially indicate one or more holds on one or more dispositions.

The record data that is received may then be stored, as indicated by a Store Record Data step 203.

One or more hold search criterion and associated dispositions may be received next, as indicated by a Receive Hold Search Criterion(s) and Corresponding Disposition(s) step 205. This may consist of the entry by the user through an appropriate user interface of one or more sets of search criterion and corresponding dispositions in one of the forms discussed above in connection with FIG. 1. In some systems, a disposition corresponding to the search criterion may not be part of the received information.

The entered hold search criterion and associated dispositions may then be stored, as reflected by a Store Hold Search Criterion(s) and Corresponding Dispositions(s) step 207. Each hold search criterion and its corresponding disposition may be stored in separate, but related fields in a record, such as the records 123 and 125 that were discussed above in connection with FIG. 1. In some systems, a disposition corresponding to the search criterion may not be part of the stored information.

Additional record data may then be received and stored, as reflected by a Receive Record Data step 209 and a Store Record Data step 211, respectively. Steps 209 and 211 may be of the same type as the steps 201 and 203 that were discussed above, respectively. One difference may be that they take place after the Receive and Store Search Criterion(s) and Corresponding Disposition(s) steps 205 and 207.

More search criterion and corresponding dispositions may then be received and stored, as reflected by a Receive Search Criterion(s) and Corresponding Disposition(s) step 213 and a Store Search Criterion(s) and Disposition(s) step 215, respectively. Steps 213 and 215 may be the same type as the steps 205 and 207 that were discussed above, respectively. One difference may be that they take place at a different time as the steps 205 and 207, such as on a different day. They may or may not also be separated by the receipt and storage of record data, as reflected by steps 209 and 211.

The same or different search criterion may be entered for different corresponding dispositions, while the same or different corresponding dispositions may be entered for different search criterion.

Although record data, search criterion and dispositions have each thus far been described as being received and stored on two occasions, any one of these or all of these may be received and stored on only a single occasion, on more than two occasions, and/or in any other sequence. For example, record data might only be received and stored before the hold search criterion is received and stored, or only afterwards.

Figure 3:
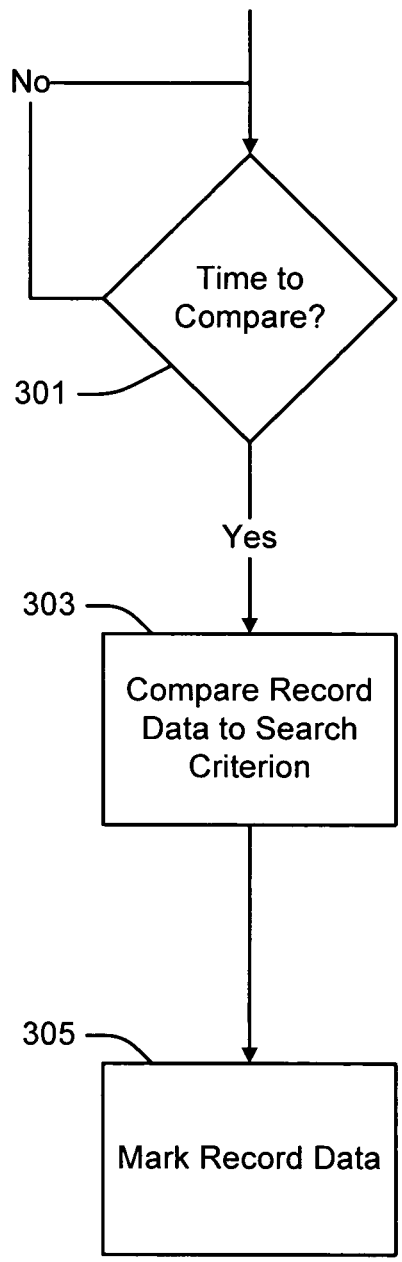
FIG. 3 is a flow diagram of a record management method that applies hold search criteria in accordance with a pre-determined schedule.

FIG. 3 is a flow diagram of a record management method that applies hold search criteria in accordance with a pre-determined schedule. As indicated by a Time to Compare decision step 301, the processing system 151 in FIG. 1 may check the hold search schedule 141 in FIG. 1 to determine whether a pre-determined time has arrived for a search of the record data 101. Such a search may be performed in accordance with this schedule to determine whether the record data contains any records that match any of the search criterion, such as any of the search criterion fields 129 shown in FIG. 1. As discussed above in connection with the hold search schedule 141, the schedule may consist of a single time, multiple times, times keyed to events, a periodic schedule, or any other type of schedule.

Once a scheduled time is determined to have arrived, the record data 101 may then be compared to the search criterion fields 129, as reflected by a Compare Record Data to Search Criteria step 303. The activity that may occur at this point may depend upon the format of the search criterion fields 129 and the record data 101. For example, the search criterion fields 129 may be compared against the metadata for each record, such as the descriptions of record fields 109. All or portions of the search criterion fields 129 may in addition or instead be compared to the record content fields 111 or, if the record content fields 111 merely point to the record content, to the record content to which each field points. Each record in the record data 101, including the records 103 and 105, may be compared to each of the hold search criterion 129. Any algorithm and associated comparison technology may be used to determine when there are matches, including fuzzy logic.

Records that match a particular search criterion may then be marked as matching records by marking the record data, such as by modifying the corresponding hold status field 113 of the record. For example, records that match a search criterion that identifies records that should be withheld from destruction may have their hold status fields 113 modified to indicate that these records should be withheld from destruction. This marking step is indicated by a mark record data step 305.

The comparison and marking process may continue until each record in the Record Data database 101 is compared against each of the search criterion in the hold search criteria 121 and until all of the hold status fields associated with all of the matching records are properly updated.

Although not shown in FIG. 3, the method may also include the application of hold search criteria at such time as a user makes a request for such an application.

Figure 4:
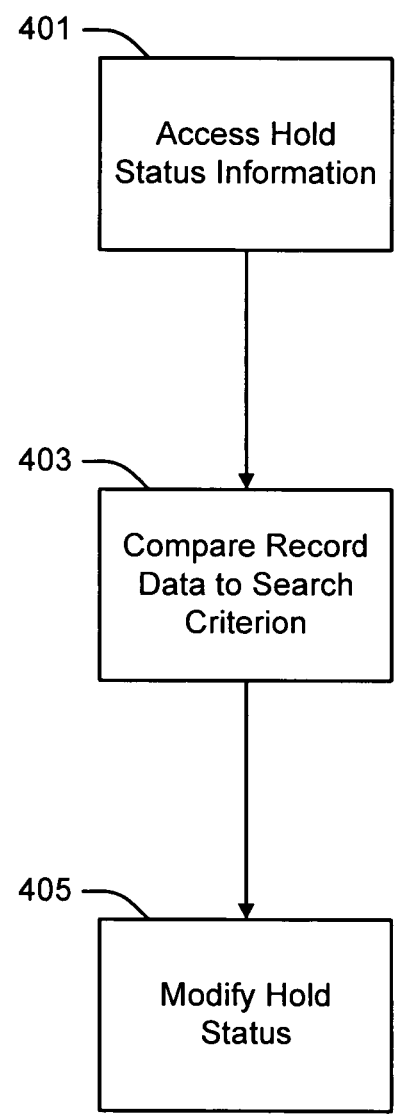
FIG. 4 is a flow diagram of a record management system that applies hold search criteria when the hold status of a record is checked.

FIG. 4 is a flow diagram of a record management method that applies hold search criteria when the hold status of a record is checked.

Unlike the method discussed above in connection with FIG. 3, the method illustrated in FIG. 4 may not be initiated in accordance with any pre-determined schedule. Rather, and as indicated by an Access Hold Status Information step 401, the method may be initiated at the time that the hold status field 113 of a particular record is accessed.

The hold status field of a particular record may be accessed contemporaneously with an effort to determine whether a particular record is eligible for a particular disposition. The hold status field may instead or in addition be accessed when viewing other information about a record, such as information in its descriptions of record fields 109. The hold status field of a particular record may be accessed instead or in addition at other times or during other occasions.

As shown in FIG. 4, access of the hold status field of a particular record may cause the record data of the particular record to be compared against each of the hold search criterion 129, as reflected by a Compare Record Data to Search Criterion step 403. Any matching technique or algorithm may be used, including fuzzy logic. If a match is found, the hold status information may be modified in accordance with the disposition indicated in the matching search criterion record to reflect that this particular record should be withheld from the disposition associated with the matching search criterion. This is reflected by a Modify Hold Status step 405.

For example, a check of all records may be made for the purpose of determining which may be ripe for a particular disposition. This check may result in a subset of the records initially being identified as ripe for this disposition. Thereafter, the hold status criteria may be checked and compared against the subset of records to determine which records in this subset are, in fact, not ripe for the disposition. The records that are indicated by the hold status criteria not to be ripe for the disposition may then be removed from the identified subset.

The method shown in FIG. 4 may significantly reduce the load on the processing system 151 by limiting the Compare Record Data to Search Criterion step 403 to only those records whose hold status is accessed. The access step 401, the compare step 403 and the modify step 405 may all be performed within the same operating session, that is, contemporaneously with the checking of the hold status of the record.

Figure 5:
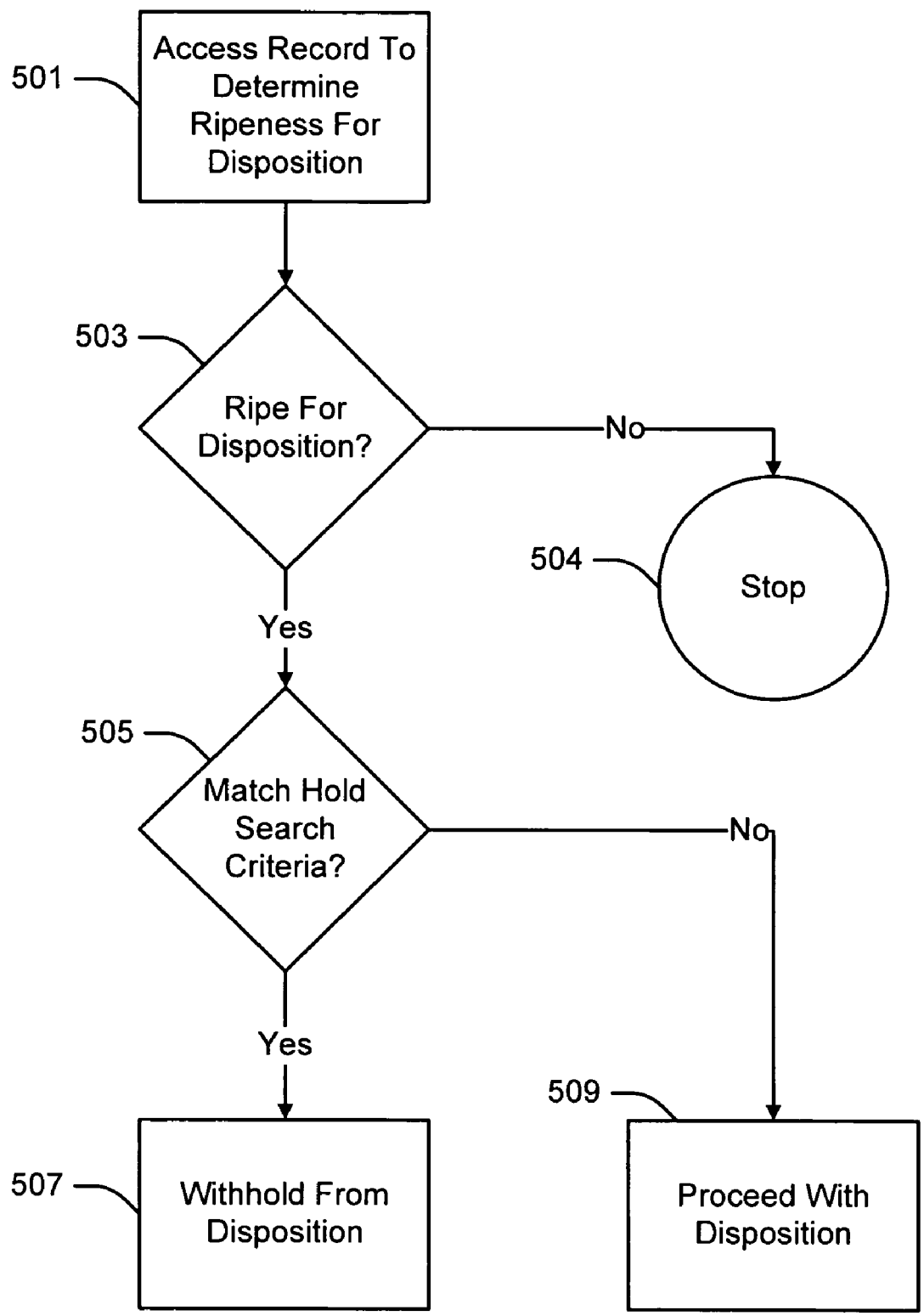
FIG. 5 is a flow diagram of a record management system that applies hold search criteria when the disposition of a record is determined.

FIG. 5 is a flow diagram of a record management system that applies hold search criteria when the disposition of a record is determined. A record in the record data 101 may be accessed to determine whether it appears to be ripe for a particular disposition, as reflected by an Access Record to Determine Ripeness For Disposition step 501. This may be done by comparing one or more of the descriptions of record fields 109 and/or all or portions of the record content fields 111 to criteria that identify records ripe for the disposition.

If the record does not appear to be ripe for the disposition, the process may stop, as reflected by a Stop step 504. If the record does appear to be ripe for the disposition, as reflected in the Yes pathway for a Ripe for Disposition decision step 503, a check may then be made to determine whether the record matches the hold search criteria for that particular disposition, as reflected by a Match Hold Search Criteria decision step 505. If it does, the record may be withheld from the disposition, as reflected by a Withhold From Disposition decision step 507. If it does not, the method may proceed with the disposition, as reflected by a Proceed With Disposition Step 509.

The method illustrated in FIG. 5 may be repeated for one or more other records in the record data 101 and, if desired, all of the records in the record data 101. Like FIG. 4, the method of FIG. 5 may save processing time by only causing the comparison to the hold search criteria to be made for records that appear to be ripe for a particular disposition.

The hold search criteria 121, the hold search schedule 141, and the record data 101 may be stored in one or more databases. The databases may be of any format, such as flat files, relational, hierarchical, or any combination of these. The databases may be stored at a single location or may be distributed over several locations. The databases may be stored in any type of storage media, including RAM, ROM, hard drives, CDs, DVDs, and tapes.

The methods of placing holds on the disposition of records that have been discussed and illustrated are dynamic. They may not require specific direction by a user of the system on the occasions on which the holds are placed. They also may be placed on records that are entered into the record management system after the hold search criteria are specified.

The various blocks and steps that have been described may be implemented with any technology, including hardware, software or any combination of hardware and software. General purpose and/or dedicated computers may be used in stand alone and/or network configurations, such as local area networks, wide area networks, the Internet and/or any combination of these. Communications between various components and/or subsystems may be over wires, wireless, and/or over any combination of these technologies. All or portions of any software that forms a part of the record management system may be stored on computer-readable media, such as one or more CD ROMs, DVDs, tapes, hard disks, RAM, and/or ROM, or on any combination of these.

The embodiments that have been described are for illustration purposes only. Modifications to these embodiments will be readily apparent to those skilled in the art, and the principles inherent therein may be applied to other embodiments.

The claims below are not limited to the embodiments that have been disclosed, but are to be accorded the fullest possible scope consistent with the language that is used in them. They are intended to encompass all structural and functional equivalents. Nothing stated or illustrated herein is intended to be dedicated to the public, regardless of whether it is recited in the claims. No claim element is intended to be construed under the provisions of 35 U.S.C. §112, sixth paragraph, unless the claim element includes the phrase "means for" or "step for."

I claim:

1. A dynamic method for withholding certain records in a records management system from a disposition comprising:
    receiving, with a processing system having computer-readable storage media, search criteria that identifies records that should be withheld from the disposition, wherein a type of the disposition comprises one of destruction, transfer, review, and archiving of the records, wherein the records that should be withheld from the disposition are records that are not disposed of in accordance with the disposition, wherein a search criterion is provided for each type of disposition;
    storing multiple search criteria records by storing each search criterion and the disposition in one search criteria record;
    receiving record data comprising at least one of the content of records and information describing the records, wherein each of the records includes a hold status field that indicates, for each type of disposition, an indication of whether the type of disposition is on hold, wherein the type of disposition is one of destruction, transfer, review, and archiving, wherein the indication indicates whether to hold destruction of the record, whether to hold transfer of the record, whether to hold review of the record, and whether to hold archiving of the record;
    storing the record data;
    comparing the record data with a first search criterion of the search criteria in accordance with a pre-determined schedule to determine which of the records should be withheld from a first disposition, wherein the first search criterion includes user-entered search criterion for locating record data that is to be withheld from the first disposition based on at least one of the information describing the records, the content of the records, and files to which the content of the records point;
    marking the record data to identify the records that should be withheld from the first disposition based on the comparing by updating hold status fields of the determined records to indicate that these records are to be withheld from the first disposition stored with the first search criterion;
    receiving a second search criterion of the search criteria;
    storing the second search criterion; and
    comparing the record data with the first search criterion and the second search criterion in accordance with the pre-determined schedule to determine which of the records should be withheld from the first disposition or a second disposition.

2. The dynamic method of claim 1 wherein the pre-determined schedule repeats periodically.

3. The dynamic method of claim 1 wherein the first search criterion is received on a different day than the second search criterion.

4. The dynamic method of claim 1 wherein the first search criterion and the second search criterion are different.

5. The dynamic method of claim 1 wherein the first disposition and the second disposition are different.

6. The dynamic method of claim 1 wherein at least a portion of the record data that is compared is received and stored after the receiving and storing of the first search criterion.

7. A dynamic method for withholding certain records in a records management system from a disposition comprising:
    receiving, with a processing system having computer-readable storage media, a first search criterion that identifies records that should be withheld from a first disposition, wherein the first disposition comprises one of destruction, transfer, review, and archiving of the records, wherein the records that should be withheld from the first disposition are records that are not disposed of in accordance with the first disposition;
    storing the first search criterion;
    receiving record data comprising at least one of the content of records and information describing the records, wherein each of the records includes a hold status field that indicates, for each type of disposition, an indication of whether the type of disposition is on hold, wherein the type of disposition is one of destruction, transfer, review, and archiving, wherein the indication indicates whether to hold destruction of the record, whether to hold transfer of the record, whether to hold review of the record, and whether to hold archiving of the record;

storing the record data along with hold status information in the hold status field for each record;

accessing the hold status information for one of the records;

in response to accessing the hold status information, comparing the hold status information for one of the records with the first search criterion to determine whether the record data for the one of the records matches the first search criterion, wherein the first search criterion includes user-entered search criterion for locating record data that is to be withheld from the first disposition based on at least one of the information describing the records, the content of the records, and files to which the content of the records point;

modifying the hold status information for the one of the records after the comparing to reflect that the one of the records should be withheld from the first disposition associated with the first search criterion;

receiving a second search criterion;

storing the second search criterion; and comparing the record data about the one of the records with the first search criterion and the second search criterion to determine whether the record data for the one of the records matches either search criterion.

8. The dynamic method of claim 7 wherein the accessing and the comparing are performed sequentially within the same operating session.

9. The dynamic method of claim 7 wherein the accessing, comparing and modifying are performed sequentially within the same operating session.

10. The dynamic method of claim 7 wherein the accessing occurs as part of an effort to determine which records in the records management system are ripe for the disposition.

11. The dynamic method of claim 7 wherein the record data includes information describing the records and the accessing occurs as part of an effort to examine a portion of this information.

12. The dynamic method of claim 7 wherein the first search criterion is received on a different day than the second search criterion.

13. The dynamic method of claim 7 wherein the first search criterion and the second search criterion are different.

14. The dynamic method of claim 7 wherein the first disposition and the second disposition are different.

15. The dynamic method of claim 7 wherein at least a portion of the record data that is compared is received and stored after the receiving and storing of the first search criterion.

16. A dynamic method for withholding certain records in a records management system from a disposition comprising:

receiving, with a processing system having computer-readable storage media, a first search criterion that identifies records that should be withheld from a first disposition, wherein the first disposition comprises one of destruction, transfer, review, and archiving of the records, wherein the records that should be withheld from the first disposition are records that are not disposed of in accordance with the first disposition;

storing the first search criterion;

receiving record data comprising at least one of the content of records and information describing the records, wherein each of the records includes a hold status field that indicates, for each type of disposition, an indication of whether the type of disposition is on hold, wherein the type of disposition is one of destruction, transfer, review, and archiving, wherein the indication indicates whether to hold destruction of the record, whether to hold transfer of the record, whether to hold review of the record, and whether to hold archiving of the record;

storing the record data that comprises multiple records;

identifying one or more records within the record data that are ripe for the first disposition associated with the first search criterion by, for each of the multiple records, comparing one of the content of records and information describing the records to the first search criterion, wherein the first search criterion includes user-entered search criterion for locating record data that is to be withheld from the first disposition based on at least one of the information describing the records, the content of the records, and files to which the content of the records point;

checking the hold search criteria for the identified one or more records to determine which of the identified one or more records are not ripe for the first disposition;

removing records from the identified one or more records that are indicated by the hold status criteria as not ripe for the first disposition;

receiving a second search criterion;

storing the second search criterion; and identifying one or more records within the record data that are ripe for the first disposition associated with the first search criterion or a second disposition associated with the second search criterion.

17. The dynamic method of claim 16 further comprising withholding from the disposition all records in the one or more records that match the first search criterion based on the hold search criteria.

18. A dynamic method for withholding records in a records management system from a disposition comprising:

receiving, with a processing system having computer-readable storage media, a first search criterion that identifies records that should be withheld from a first disposition, wherein the first disposition comprises one of destruction, transfer, review, and archiving of the records, wherein the records that should be withheld from the first disposition are records that are not disposed of in accordance with the first disposition;

storing the first search criterion;

receiving record data comprising at least one of the content of records and information describing the records, wherein each of the records includes a hold status field that indicates, for each type of disposition, an indication of whether the type of disposition is on hold, wherein the type of disposition is one of destruction, transfer, review, and archiving, wherein the indication indicates whether to hold destruction of the record, whether to hold transfer of the record, whether to hold review of the record, and whether to hold archiving of the record;

storing the record data;

comparing at least a portion of the record data with the first search criterion to determine which of the records should be withheld from the first disposition, wherein the first search criterion includes user-entered search criterion for locating record data that is to be withheld from the first disposition based on at least one of the information describing the records, the content of the records, and files to which the content of the records point;

marking the record data to identify the first set of records that should be withheld from the first disposition based on the comparing by updating hold status fields of the determined records to indicate that these records are to be withheld from the first disposition stored with the first search criterion;

receiving second search criterion;

storing the second search criterion; and comparing at least a portion of the record data with the first search criterion and the second search criterion to determine which of the records should be withheld from the first disposition or second disposition.

19. The dynamic method of claim 18 wherein the first search criterion is received on a different day than the second search criterion.

20. The dynamic method of claim 18 wherein the first search criterion and the second search criterion are different.

21. The dynamic method of claim 18 wherein the first disposition and the second disposition are different.

22. A dynamic method for designating certain records in a records management system that should be withheld from one or more dispositions comprising:

receiving, with a processing system having computer-readable storage media, a first search criterion that identifies records in the records management system that should be withheld from a first disposition, wherein the first disposition comprises one of destruction, transfer, review, and archiving of the records, wherein the records that should be withheld from the first disposition are records that are not disposed of in accordance with the first disposition;

receiving an identification of the first disposition;

storing the first search criterion, the identification of the first disposition, and a relationship between the two, wherein the first search criterion includes user-entered search criterion for locating record data that is to be withheld from the first disposition based on at least one of information describing the records, content of the records, and files to which the content of the records point;

receiving record data comprising at least one of the content of records and information describing the records, wherein each of the records includes a hold status field that indicates, for each type of disposition, an indication of whether the type of disposition is on hold, wherein the type of disposition is one of destruction, transfer, review, and archiving, wherein the indication indicates whether to hold destruction of the record, whether to hold transfer of the record, whether to hold review of the record, and whether to hold archiving of the record;

storing the record data;

receiving a second search criterion;

receiving an identification of a second disposition; and storing the second search criterion, the identification of the second disposition, and a relationship between the two, together with the first search criterion, the identification of the first disposition, and the relationship between the two.

23. The dynamic method of claim 22 the second search criterion is different from the first search criterion.

24. The dynamic method of claim 22 wherein the first disposition is different from the second disposition.

25. The dynamic method of claim 22 wherein the storing of the relationships includes storing the first criterion and the identification of the first disposition in a first record and storing the second criterion and the identification of the second disposition in a second record.

26. A system for withholding certain records in a records management system from a disposition comprising:

first storage media configured to store search criteria;

second storage media configured to store a pre-determined schedule;

third storage media configured to store record data comprising the content of records and/or information describing the records; and a processing system configured to:

receive search criteria that identifies records that should be withheld from the disposition, wherein a type of the disposition comprises one of destruction, transfer, review, and archiving of the records, wherein the records that should be withheld from the disposition are records that are not disposed of in accordance with the disposition, wherein a search criterion is provided for each type of disposition;

store multiple search criteria records by storing each search criterion and the disposition in one search criteria record;

receive record data comprising at least one of the content of records and information describing the records, wherein each of the records includes a hold status field that indicates, for each type of disposition, an indication of whether the type of disposition is on hold, wherein the type of disposition is one of destruction, transfer, review, and archiving, wherein the indication indicates whether to hold destruction of the record, whether to hold transfer of the record, whether to hold review of the record, and whether to hold archiving of the record;

store the record data;

compare the record data with a first search criterion of the search criteria in accordance with a pre-determined schedule to determine which of the records should be withheld from a first disposition, wherein the first search criterion includes user-entered search criterion for locating record data that is to be withheld from the first disposition based on at least one of the information describing the records, the content of the records, and files to which the content of the records point;

mark the record data to identify the records that should be withheld from the first disposition based on the comparing by updating hold status fields of the determined records to indicate that these records are to be withheld from the first disposition stored with the first search criterion;

receive a second search criterion of the search criteria;

store the second search criterion; and compare the record data with the first search criterion and the second search criterion in accordance with the pre-determined schedule to determine which of the records should be withheld from the first disposition or a second disposition.

27. A system for withholding certain records in a records management system from a disposition comprising:

first storage media configured to store search criteria;

second storage media configured to store record data comprising the content of records and/or information describing the records and hold status information for each record indicating whether the record should be withheld from the disposition; and a processing system configured to:

receive a first search criterion that identifies records that should be withheld from a first disposition, wherein the first disposition comprises one of destruction, transfer, review, and archiving of the records, wherein the records that should be withheld from the first disposition are records that are not disposed of in accordance with the first disposition;

store the first search criterion;

receive record data comprising at least one of the content of records and information describing the records, wherein each of the records includes a hold status field that indicates, for each type of disposition, an indication of whether the type of disposition is on hold, wherein the type of disposition is one of destruction, transfer, review, and archiving, wherein the indication indicates whether to hold destruction of the record, whether to hold transfer of the record, whether to hold review of the record, and whether to hold archiving of the record;

store the record data along with hold status information in the hold status field for each record;

access the hold status information for one of the records;

in response to accessing the hold status information, compare the hold status information for one of the records with the first search criterion to determine whether the record data for the one of the records matches the first search criterion, wherein the first search criterion includes user-entered search criterion for locating record data that is to be withheld from the first disposition based on at least one of the information describing the records, the content of the records, and files to which the content of the records point;

modify the hold status information for the one of the records after the comparing to reflect that the one of the records should be withheld from the disposition associated with the first search criterion;

receive a second search criterion;

store the second search criterion; and compare the record data about the one of the records with the first search criterion and the second search criterion to determine whether the record data for the one of the records matches either search criterion.

28. A system for withholding certain records in a records management system from a disposition comprising:

first storage media configured to store search criteria;

second storage media configured to store record data comprising the content of records and/or information describing the records; and a processing system configured to:

receive a first search criterion that identifies records that should be withheld from a first disposition, wherein the first disposition comprises one of destruction, transfer, review, and archiving of the records, wherein the records that should be withheld from the first disposition are records that are not disposed of in accordance with the first disposition;

store the first search criterion;

receive record data comprising at least one of the content of records and information describing the records, wherein each of the records includes a hold status field that indicates, for each type of disposition, an indication of whether the type of disposition is on hold, wherein the type of disposition is one of destruction, transfer, review, and archiving, wherein the indication indicates whether to hold destruction of the record, whether to hold transfer of the record, whether to hold review of the record, and whether to hold archiving of the record;

store the record data that comprises multiple records;

identify one or more records within the record data that are ripe for the first disposition associated with the first search criterion by, for each of the multiple records, comparing one of the content of records and information describing the records to the first search criterion, wherein the first search criterion includes user-entered search criterion for locating record data that is to be withheld from the first disposition based on at least one of the information describing the records, the content of the records, and files to which the content of the records point;

check the hold search criteria for the identified one or more records to determine which of the identified one or more records are not ripe for the first disposition;

remove records from the identified one or more records that are indicated by the hold status criteria as not ripe for the first disposition;

receive a second search criterion;

store the second search criterion; and identify one or more records within the record data that are ripe for the first disposition associated with the first search criterion or a second disposition associated with the second search criterion.

29. Computer-readable storage media containing computer programming instructions that implement the following when run on a computing system:

receiving search criteria that identifies records that should be withheld from the disposition, wherein a type of the disposition comprises one of destruction, transfer, review, and archiving of the records, wherein the records that should be withheld from the disposition are records that are records that are not disposed of in accordance with the disposition, wherein a search criterion is provided for each type of disposition;

storing multiple search criteria records by storing each search criterion and the disposition in one search criteria record;

receiving record data comprising at least one of the content of records and information describing the records, wherein each of the records includes a hold status field that indicates, for each type of disposition, an indication of whether the type of disposition is on hold, wherein the type of disposition is one of destruction, transfer, review, and archiving, wherein the indication indicates whether to hold destruction of the record, whether to hold transfer of the record, whether to hold review of the record, and whether to hold archiving of the record;

storing the record data;

comparing the record data with a first search criterion of the search criteria in accordance with a pre-determined schedule to determine which of the records should be withheld from a first disposition, wherein the first search criterion includes user-entered search criterion for locating record data that is to be withheld from the first disposition based on at least one of the information describing the records, the content of the records, and files to which the content of the records point;

marking the record data to identify the records that should be withheld from the first disposition based on the comparing by updating hold status fields of the determined records to indicate that these records are to be withheld from the first disposition stored with the first search criterion;

receiving a second search criterion of the search criteria;

storing the second search criterion; and comparing the record data with the first search criterion and the second search criterion in accordance with the pre-determined schedule to determine which of the records should be withheld from the first disposition or a second disposition.

30. Computer-readable storage media containing computer programming instructions that implement the following when run on a computing system:

receiving a first search criterion that identifies records that should be withheld from a first disposition, wherein the first disposition comprises one of destruction, transfer, review, and archiving of the records, wherein the records that should be withheld from the first disposition are records that are not disposed of in accordance with the disposition;

storing the first search criterion;

receiving record data comprising at least one of the content of records and information describing the records, wherein each of the records includes a hold status field that indicates, for each type of disposition, an indication of whether the type of disposition is on hold, wherein the type of disposition is one of destruction, transfer, review, and archiving, wherein the indication indicates whether to hold destruction of the record, whether to hold transfer of the record, whether to hold review of the record, and whether to hold archiving of the record;

storing the record data along with hold status information in the hold status field for each record;

accessing the hold status information for one of the records;

in response to accessing the hold status information, comparing the hold status information for one of the records with the search criterion to determine whether the record data for the one of the records matches the search criterion, wherein the search criterion includes user-entered search criterion for locating record data that is to be withheld from the disposition based on at least one of the information describing the records, the content of the records, and files to which the content of the records point;

modifying the hold status information for the one of the records after the comparing to reflect that the one of the records should be withheld from the first disposition associated with the first search criterion;

receiving a second search criterion;

storing the second search criterion; and comparing the record data about the one of the records with the first search criterion and the second search criterion to determine whether the record data for the one of the records matches either search criterion.

31. Computer-readable storage media containing computer programming instructions that implement the following when run on a computing system:

receiving a first search criterion that identifies records that should be withheld from a first disposition, wherein the first disposition comprises one of destruction, transfer, review, and archiving of the records, wherein the records that should be withheld from the first disposition are records that are not disposed of in accordance with the first disposition;

storing the first search criterion;

receiving record data comprising at least one of the content of records and information describing the records, wherein each of the records includes a hold status field that indicates, for each type of disposition, an indication of whether the type of disposition is on hold, wherein the type of disposition is one of destruction, transfer, review, and archiving, wherein the indication indicates whether to hold destruction of the record, whether to hold transfer of the record, whether to hold review of the record, and whether to hold archiving of the record;

storing the record data that comprises multiple records;

identifying one or more records within the record data that are ripe for the first disposition associated with the first search criterion by, for each of the multiple records, comparing one of the content of records and information describing the records to the first search criterion, wherein the first search criterion includes user-entered search criterion for locating record data that is to be withheld from the first disposition based on at least one of the information describing the records, the content of the records, and files to which the content of the records point;

checking the hold search criteria for the identified one or more records to determine which of the identified one or more records are not ripe for the first disposition;

removing records from the identified one or more records that are indicated by the hold status criteria as not ripe for the first disposition;

receiving a second search criterion;

storing the second search criterion; and identifying one or more records within the record data that are ripe for the first disposition associated with the first search criterion or a second disposition associated with the second search criterion.

\* \* \* \* \*